(12) United States Patent
Burckart et al.

(10) Patent No.: US 10,346,501 B2
(45) Date of Patent: *Jul. 9, 2019

(54) MOBILE ENABLEMENT OF EXISTING WEB SITES

(71) Applicant: International Business Machines Corporation, Armonk, NY (US)

(72) Inventors: Erik J. Burckart, Raleigh, NC (US); Gennaro A. Cuomo, Cary, NC (US); Dinakaran Joseph, Apex, NC (US); Todd E. Kaplinger, Raleigh, NC (US); Victor S. Moore, Lake City, FL (US); Gregory L. Truty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 498 days.

This patent is subject to a terminal disclaimer.

(21) Appl. No.: 13/801,830

(22) Filed: Mar. 13, 2013

(65) Prior Publication Data
US 2014/0281883 A1    Sep. 18, 2014

(51) Int. Cl.
*G06F 17/00*    (2019.01)
*G06F 16/958*    (2019.01)

(52) U.S. Cl.
CPC .................................. *G06F 16/972* (2019.01)

(58) Field of Classification Search
CPC .................................................. G06F 17/30893
See application file for complete search history.

(56) References Cited

U.S. PATENT DOCUMENTS

| 6,356,899 B1 | 3/2002 | Chakrabarti et al. |
| 6,980,175 B1 | 12/2005 | Narayanaswami |
| 7,171,616 B1 | 1/2007 | Berstis |
| 7,343,559 B1 | 3/2008 | Fujita et al. |
| 7,386,786 B2 | 6/2008 | Davis et al. |

(Continued)

FOREIGN PATENT DOCUMENTS

| CN | 101980152 A | 2/2011 |
| CN | 102567384 A | 7/2012 |

(Continued)

OTHER PUBLICATIONS

Thomas Myer, "Begining PHoneGap", total pp. 9, 2002, URL: <http://techbus.safaribooksonline.com/print?xmlid=9781118156650%2>.*

(Continued)

*Primary Examiner* — Mustafa A Amin
(74) *Attorney, Agent, or Firm* — Scully, Scott, Murphy & Presser, P.C.; Robert J. Shatto

(57) ABSTRACT

Mobile enablement of a web site, in one aspect, may comprise separating the web application into a static content and a dynamic content, the dynamic content comprising one or more data sources from which to retrieve data at runtime of the web application; rendering the static content as one or more hypertext markup language pages with one or more links between the hypertext markup language pages converted to local links; changing one or more references to the dynamic content to representational state transfer requests; enabling the representational state transfer requests from said one or more hypertext markup language pages; and packaging said one or more hypertext markup language pages as the mobile application.

20 Claims, 10 Drawing Sheets

(56) References Cited

U.S. PATENT DOCUMENTS

| | | | |
|---|---|---|---|
| 7,788,577 B2 | 8/2010 | Lueck | |
| 7,911,409 B1 | 3/2011 | Chatterjee et al. | |
| 8,073,895 B2 | 12/2011 | Hamzeh et al. | |
| 8,627,216 B2 | 1/2014 | Brichford et al. | |
| 8,694,925 B1 | 4/2014 | Beust et al. | |
| 9,244,606 B2 | 1/2016 | Kocienda et al. | |
| 9,513,762 B1 | 12/2016 | Hakim et al. | |
| 2002/0054126 A1 | 5/2002 | Gamon | |
| 2003/0030839 A1 | 2/2003 | Walters et al. | |
| 2004/0148565 A1* | 7/2004 | Davis | G06F 17/3089 715/205 |
| 2004/0148571 A1* | 7/2004 | Lue | G06F 17/30905 715/239 |
| 2004/0172637 A1 | 9/2004 | Koutyrine | |
| 2004/0209607 A1* | 10/2004 | Stepanich | H04M 1/72522 455/418 |
| 2005/0091576 A1 | 4/2005 | Relyea et al. | |
| 2006/0062362 A1 | 3/2006 | Davis | |
| 2006/0085741 A1 | 4/2006 | Weiner et al. | |
| 2006/0168285 A1 | 7/2006 | Nielsen et al. | |
| 2006/0288280 A1 | 12/2006 | Makela | |
| 2007/0130525 A1 | 6/2007 | Murphy et al. | |
| 2007/0220507 A1* | 9/2007 | Back | G06F 8/71 717/170 |
| 2007/0239726 A1 | 10/2007 | Weiss et al. | |
| 2008/0072139 A1 | 3/2008 | Salinas et al. | |
| 2009/0013037 A1 | 1/2009 | Bodmer et al. | |
| 2009/0125533 A1 | 5/2009 | Calbucci | |
| 2009/0132572 A1 | 5/2009 | Massie et al. | |
| 2009/0204481 A1 | 8/2009 | Navar et al. | |
| 2009/0222438 A1* | 9/2009 | Strandell | G06F 17/3087 |
| 2009/0327399 A1 | 12/2009 | Dorbes et al. | |
| 2010/0035657 A1* | 2/2010 | Blenessy | G06F 17/30905 455/566 |
| 2010/0064209 A1 | 3/2010 | Wielgosz et al. | |
| 2010/0145946 A1* | 6/2010 | Conrad | G06F 17/30887 707/736 |
| 2010/0169761 A1* | 7/2010 | Lee | G06F 17/30887 715/234 |
| 2010/0174974 A1 | 7/2010 | Brisebois et al. | |
| 2010/0199197 A1 | 8/2010 | Faletski et al. | |
| 2011/0047577 A1 | 2/2011 | Modi et al. | |
| 2011/0287750 A1 | 11/2011 | Watanabe et al. | |
| 2012/0060087 A1 | 3/2012 | Jame et al. | |
| 2012/0102429 A1 | 4/2012 | Naderi et al. | |
| 2012/0131446 A1 | 5/2012 | Park | |
| 2012/0131683 A1 | 5/2012 | Nassar et al. | |
| 2012/0159380 A1 | 6/2012 | Kocienda et al. | |
| 2012/0220263 A1 | 8/2012 | Smith et al. | |
| 2013/0013921 A1* | 1/2013 | Bhathena | H04L 9/0825 713/168 |
| 2013/0086639 A1 | 4/2013 | Sondhi et al. | |
| 2013/0091439 A1 | 4/2013 | Sirpal et al. | |
| 2013/0104114 A1 | 4/2013 | Reiss et al. | |
| 2013/0152070 A1 | 6/2013 | Bhullar et al. | |
| 2013/0174015 A1 | 7/2013 | Jeff L. | |
| 2013/0227078 A1 | 8/2013 | Wei et al. | |
| 2013/0302005 A1 | 11/2013 | Harwell et al. | |
| 2014/0281881 A1 | 9/2014 | Burckart et al. | |
| 2014/0281906 A1 | 9/2014 | Burckart et al. | |

FOREIGN PATENT DOCUMENTS

| | | |
|---|---|---|
| CN | 102647716 A | 8/2012 |
| CN | 102802128 A | 11/2012 |
| CN | 102999624 A | 3/2013 |

OTHER PUBLICATIONS

Antony Lees, "Random Code Solution", pp. 1-14, Feb. 27, 2013, URL:<http://antonylees.blogspot.com/2013/02/launch-website-as-mobile-app-using.html>.*

Raymond Camden, "COnverting a dynamic web site to a PhoneGap Application", May 5, 2012, URL:<http://www.raymondcamden.com/2012/05/05/converting-a-dynamic-web-site-to-a-phonegap-application>.*

Giacomo Andreucci, "Pro iOS Geo: Building Apps with Location Based Services", publication date: Jan. 30, 2013, pp. 1-9, URL:<http://techbus.safaribooksonline.com/book/programming/mobile/9781430247043/chapter-7-creating-hybrid-app>.*

Lees Antony, "Launch a website as a mobile app using PhoneGap/Apache Cordova", pp. 1-11, dated Feb. 27, 2013, URL <http://antonylees.blogspot.com/2013/02/Iaunch-website-as-mobile-app-using.html> (Year: 2013).*

U.S. Office Action dated Jul. 2, 2015 issued in U.S. Appl. No. 13/801,848.

U.S. Office Action dated Jul. 13, 2015 issued in U.S. Appl. No. 14/079,031.

Sarah Allen et al., PhoneGap, Pro Smartphone Cross-Platform Development, 2010, Part 2, p. 131-152, DOI: 10.1007/978-1-4302-2869-1_8.

Yu Ping et al., Transforming legacy web applications to the MVC architecture, Proceedings of the eleventh annual international workshop on Software Technology and Engineering Practice (STEP 2004), Dec. 2004, pp. 1-10, DOI: 10.1109/STEP.2003.35.

Office Action dated Apr. 3, 2015 received in U.S. Appl. No. 13/801,820.

Office Action dated Apr. 3, 2015 received in U.S. Appl. No. 14/079,209.

Office Action dated Aug. 20, 2015 received in U.S. Appl. No. 13/801,924.

Office Action dated Aug. 20, 2015 received in U.S. Appl. No. 14/079,194.

Wieland, S., "Design and Implementation of a Gateway for Web-based Interaction and Management of Embedded Devices", Master's Thesis, Mar. 30, 2009, pp. 1-101.

Hamad, H., et al., "Performance Evaluation of RESTful Web Services for Mobile Devices", International Arab Journal of e-Technology, Jan. 2010, pp. 72-78, vol. 1, No. 3.

U.S. Office Action dated Dec. 30, 2015 issued in U.S. Appl. No. 14/079,209, pp. 1-33.

U.S. Office Action dated Dec. 31, 2015 issued in U.S. Appl. No. 13/801,820, pp. 1-35.

Office Action dated Feb. 1, 2016 received in U.S. Appl. No. 13/801,848, pp. 1-32.

Office Action dated Feb. 1, 2016 received in U.S. Appl. No. 14/079,031, pp. 1-27.

SnipplR, "Zip code from HTML5 Geolocation", Posted on Mar. 30, 2011, retrieved from http://snipplr.com/iew/51293/zipcodefromhtml5geolocation/ on Feb. 19, 2016, 4 pages.

Office Action dated Apr. 22, 2016 received in U.S. Appl. No. 13/801,892, 39 pages.

Office Action dated May 6, 2016 received in U.S. Appl. No. 14/070,019, 25 pages.

Office Action dated Mar. 20, 2017 received in U.S. Appl. No. 13/801,892, 25 pages.

JQBatch, "jQuery Batch", https://github.com/mlmorg/jquery.batch/blob/b49eace671ec0db7f100d69521e65386a55f1eebJREADME.md, Aug. 20, 2012, Retrieved on Sep. 12, 2016, 3 pages.

Myer, T., "Beginning Phone Gap", John Wiley & Songs, Inc., 2012, 388 pages.

http://docs.phonegap.com/en/2.3.0/index.html, "Apache Cordova API Documentation", Printed on Feb. 12, 2013, 1 page.

http://alebelcor.blogspot.com/2011/10/html5-apis.hmtl, "HTML5 APIs", Printed on Feb. 12, 2013, 3 pages.

"Personalization Toolkit Workflow & Authorization Management", GXD00019_en, Version 1.10, GX WebManager 9.11.0 and higher, Jan. 11, 2010, pp. 1-41.

http://en.wikipedia.org/wiki/PhoneGap, "PhoneGap", Printed on Feb. 7, 2013, 5 pages.

http://www.htmltemplates.net/, "HTML Templates", Printed on Feb. 4, 2013, 2 pages.

Rykowski, J., et al., "Personalization of Information Delivery by the Use of Agent", 2003, pp. 1056-1059.

Office Action dated Sep. 19, 2016 received in U.S. Appl. No. 14/079,100, 17 pages.

(56) References Cited

OTHER PUBLICATIONS

Office Action dated Oct. 3, 2016 received in U.S. Appl. No. 14/070,019, 24 pages.
Notice of Allowance dated Sep. 26, 2016 received in U.S. Appl. No. 13/801,848, 10 pages.
Notice of Allowance dated Sep. 26, 2016 received in U.S. Appl. No. 14/079,031, 10 pages.
Office Action dated Oct. 17, 2016 received in U.S. Appl. No. 13/801,820, 39 pages.
Office Action dated Oct. 20, 2016 received in U.S. Appl. No. 14/079,209, 45 pages.
Office Action dated Jun. 30, 2017 received in U.S. Appl. No. 13/801,892, 32 pages.
Office Action dated Jun. 26, 2017 received in U.S. Appl. No. 14/079,209, 57 pages.
Office Action dated Jun. 27, 2017 received in U.S. Appl. No. 13/801,820, 57 pages.
Office Action dated Aug. 1, 2017 received in U.S. Appl. No. 14/079,100, 26 pages.
Office Action dated Apr. 20, 2017 received in U.S. Appl. No. 14/079,100, 35 pages.
Office Action dated May 4, 2017 received in U.S. Appl. No. 14/070,019, 32 pages.
Office Action dated Sep. 22, 2017 received in U.S. Appl. No. 14/070,019, 27 pages.
Office Action dated Oct. 13, 2017 received in U.S. Appl. No. 13/801,892, 29 pages.
Office Action dated May 7, 2018 received in U.S. Appl. No. 13/801,892, 30 pages.
Office Action dated Jan. 9, 2018 received in U.S. Appl. No. 13/801,820, 46 pages.
Office Action dated Jan. 9, 2018 received in U.S. Appl. No. 14/079,209, 44 pages.
Office Action dated Jan. 10, 2018 received in U.S. Appl. No. 14/070,019, 25 pages.
Office Action dated Feb. 23, 2018 received in U.S. Appl. No. 14/079,100, 18 pages.
Office Action dated Sep. 17, 2018 received in U.S. Appl. No. 13/801,892, 26 pages.
Office Action dated May 31, 2018 received in U.S. Appl. No. 14/079,100, 22 pages.
Office Action dated Jun. 15, 2018 received in U.S. Appl. No. 14/070,019, 30 pages.
Office Action dated Dec. 31, 2018 received in U.S. Appl. No. 14/070,019, 11 pages.

* cited by examiner

```
 1  <html>
 2    <head>
 3      <title>my form</title>
 4    </head>
 5    <%
 6      com.XYZ.ProfileBean profileBean = new com.XYZ.ProfileBean(request.getRemoteUser());
 7    %>
 8    <body>
 9      <FORM action="http://XYZ.com/updateUser" method="POST">
10        <P>
11        <LABEL for="firstname">First name: </LABEL>
12          <INPUT type="text" id="firstName" value='<%=profileBean.firstName%>'><BR>
13        <LABEL for="lastname">Last name: </LABEL>
14          <INPUT type="text" id="lastName" value='<%=profileBean.lastName%>'><BR>
15        <LABEL for="email">email: </LABEL>
16          <INPUT type="text" id="email" value='<%=profileBean.email%>'><BR>
17          <INPUT type="radio" name="sex" value="Male"> Male<BR>
18          <INPUT type="radio" name="sex" value="Female"> Female<BR>
19          <INPUT type="submit" value="Send"> <INPUT type="reset">
20        </P>
21      </FORM>
22    </body>
23  </html>
```

Fig. 3

```
1  {
2    "type"        : "ProfileBean",
3    "attributes"  : [
4                     ----------------
5                     ----------------
6                     "firstName",
7                     "lastName",
8                     "email",
9                     "sex"
10                   ]
11 }
```

```
import java.io.*;
import javax.servlet.*;
import javax.servlet.http.*;

public class ProfileBeanServlet extends HttpServlet { public void doGet(HttpServletRequest req, HttpServletResponse res)
                        throws ServletException, IOException { res.setContentType("text/json");
        PrintWriter out = res.getWriter();
        com.xyz.ProfileBean profileBean = new com.xyz.ProfileBean(req.getRemoteUser());
        // generate JSON data and return
    }
}
```

Fig. 6

MOBILE ENABLEMENT OF EXISTING WEB SITES

CROSS REFERENCE TO RELATED APPLICATIONS

The present application is related to commonly-owned, co-pending U.S. patent application Ser. No. 13/801,924 entitled, "TRANSFORMING APPLICATION CACHED TEMPLATE USING PERSONALIZED CONTENT", filed on Mar. 13, 2013; U.S. patent application Ser. No. 13/801,820 entitled, "MOBILE ENABLEMENT OF WEBPAGES", filed on Mar. 13, 2013; U.S. patent application Ser. No. 13/801,848 entitled, "MOBILIZING A WEB APPLICATION TO TAKE ADVANTAGE OF A NATIVE DEVICE CAPABILITY", filed on Mar. 13, 2013; and U.S. patent application Ser. No. 13/801,892 entitled, "ENHANCED MOBILIZATION OF EXISTING WEB SITES", filed on Mar. 13, 2013, the entire contents and disclosures of which are expressly incorporated by reference herein as if fully set forth herein.

FIELD

The present application relates generally to computers, and computer applications, and more particularly to mobile device applications and converting existing web sites as mobile applications.

BACKGROUND

A mobile application (also referred to as mobile app) refers to a software application that is run on a mobile device. Existing web sites are usually developed for access by a desktop computer or the like with full capacity to screens, networking bandwidth, connection, and others. For at least those reasons, accessing those web sites from a mobile device (e.g., those that might experience network disconnects or loss as the device moves from one area to another, narrow bandwidth, and other characteristics inherent in mobile devices) proves to be inefficient.

As another aspect, a mobile app is deployed into an application store such as an "App Store", when it is created. Whenever any updates are needed to be done to the mobile app, the entire updated mobile app is loaded back into such application store. Once the mobile app is updated on the application store, the entire application is then downloaded to the mobile device and reinstalled. Current known methodologies do not allow for selective updates, it is not possible to perform partial updates of an application using known solutions.

BRIEF SUMMARY

A method of converting a web application to a mobile application, in one aspect, may comprise separating the web application into a static content and a dynamic content. The dynamic content may comprise one or more data sources from which to retrieve data at runtime of the web application. The method may also comprise rendering the static content as one or more hypertext markup language pages with one or more links between the hypertext markup language pages converted to local links. The method may further comprise changing one or more references to the dynamic content to representational state transfer requests. The method may also comprise enabling the representational state transfer requests from said one or more hypertext markup language pages. The method may further comprise packaging said one or more hypertext markup language pages as the mobile application.

A system converting a web application to a mobile application, in one aspect, may comprise a conversion module operable to execute on a processor, the conversion module further operable to separating the web application into a static content and a dynamic content, the dynamic content comprising one or more data sources from which to retrieve data at runtime of the web application. The conversion module may be further operable to render the static content as one or more hypertext markup language pages with one or more links between the hypertext markup language pages converted to local links. The conversion module may be further operable to change one or more references to the dynamic content to representational state transfer requests to enable the representational state transfer requests from said one or more hypertext markup language pages. The one or more hypertext markup language pages may be packaged as the mobile application.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 3 is an example form field that allows users to update their profile.

FIG. 4 illustrates example of data modeled in JavaScript Object Notation (JSON) to denote the attributes associated with the REST request.

FIG. 5 illustrates an example of an updated client (application) based upon the parsed data model.

FIG. 6 illustrates an example of REST API for retrieving data based upon the model.

DETAILED DESCRIPTION

Figure 1:
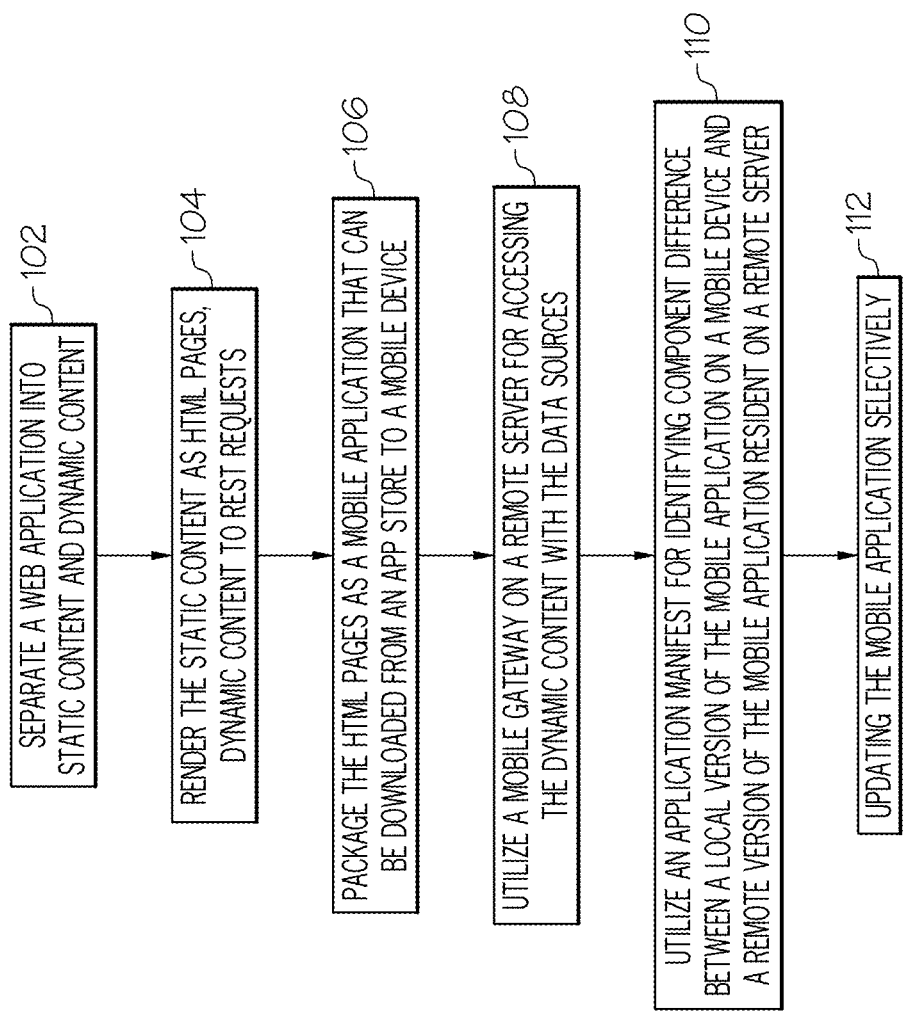
FIG. 1 is an overview of a method for converting a web application to a mobile application or hybrid mobile application in one embodiment of the present disclosure.

In one embodiment of the present disclosure, a methodology is presented that enables users or customers of a web site or the like (e.g., client/server application), for example an existing web site, to create a mobile web site. For instance, the methodology of the present disclosure in one embodiment may provide for the mobile enablement of the existing web server or application server (e.g., WebSphere™) customers that already have investments in traditional Internet Web Sites. In one aspect, the methodology of the present disclosure may create a mobile web site from the JavaServer Pages (JSPs) of an Internet Web site.

The methodology of the present disclosure in one aspect converts an existing Internet Web site into a functionally equivalent "mobile client and mobile gateway" so that the Web site can be accessed and used efficiently via mobile devices. Examples of a mobile device may include, but not limited to, a cell phone, smart phone, tablet, laptop computer, and/or others. Consider a conventional Web site, created via tooling like Eclipse™. Here the web site is composed of one or more JSPs. In one embodiment of the present disclosure, a plugin for Eclipse™ is created that reads the JSP pages from the web site above and renders the hypertext markup language (HTML) for each page into a file. Within this HTML the navigational links between these pages are changed to local links. In addition, the associated JSPs are analyzed to determine which items on these HTML pages are dynamic data. Dynamic data or dynamic content refers to data whose values are obtained for displaying on a web page, e.g., as opposed to having the data value prespecified in the HTML page. Dynamic data, e.g., may be caused to be displayed via a scripting language, e.g., embedded in the web page. So for example, a dynamic web page includes dynamic content that changes, e.g., based on user input, attributes or parameters, computer program, and/or another criterion. The methodology of the present disclosure in one embodiment modifies these JSPs to create a new set of JSPs that offer RESTful interfaces to the logic for each dynamic tag. REST stands for Representational State Transfer. This new set of HTML pages is called the mobile gateway for the web site. These tags, and their associated RESTful interfaces, are correlated with their companion dynamic tags within the HTML pages above. Next, the dynamic tags in the HTML are replaced by RESTful calls to the RESTful interfaces of the mobile gateway.

To create a mobile app the HTML pages are packaged collectively into a bundle with an icon and an interface to the "web browser" for the operating system (OS) of the mobile device. This collection constitutes a mobile app, which is deployable to an application store or the like, e.g., the iTunes™ App Store™, and other application stores. An application store refers to an online store for downloading software applications and/or mobile applications, e.g., by purchasing or free of charge.

A more sophisticated mobile app has embedded within this package a local JavaScript based client side aggregator. This aggregator batches requests from the mobile application for dynamic content and sends them to the mobile gateway in a single message. This greatly reduces network chatter and bandwidth by assembling multiple requests for dynamic data into a single request. It receives back a single response which the aggregator breaks into separate responses, one for each originating request.

Once the app is deployed to an application store it can then be downloaded to a mobile device. The app's icon is displayed on the device's home screen, and clicking on this icon will evoke and display the corresponding HTML pages on the mobile devices screen. Within these HTML pages the associated dynamic data is fetched from the respective mobile gateway. In one embodiment of the present disclosure, this is achieved via the embedded RESTful commands or the like.

Navigation among the HTML pages in an app occurs locally and thus requires no network access. This reduces network traffic and thereby improves the user experience. As each page is displayed the dynamic data for that page is fetched. There is no need to fetch either the pages HTML or JavaScript because they are already loaded onto the mobile device as part of the app. This saves network resources, makes the gateway more scalable and further improves the user experience.

The HTML and JavaScript are part of the app and are thus not fetched over the cellular network. This reduces network traffic and the load on the server. This is particularly valuable if the HTML pages include JavaScript for analytics. Dynamic data is fetched via restful means. Thus the link between the mobile client and the server is asynchronous and is thus well suited to surviving network disconnects and adapting to power saving protocols where the app is put to sleep. Using standard mobile OS techniques the app is awoken when a message is received from the server. Using restful messages is both network friendly and resource efficient. Having the HTML graphical user interface (GUI) local on the client improves the apps responsiveness to manipulation by the user. The mobile gateway provides the app with restful interfaces to the back end data. These interfaces are both network friendly and resource efficient. Multiple request for dynamic data from the app can be aggregated together to minimize the number of messages (and the amount of data) flowing over the network. This reduces the network latency experienced by the user.

A methodology of the present disclosure in one embodiment converts existing web site to a mobile friendly one that may include a mobile client and a mobile gateway. The gateway here may be a server that houses the RESTful interfaces and connectors to the back end data. A vast number of web sites may benefit mobile enablement.

FIG. 1 is an overview of a method for enabling existing web sites to be mobile, e.g., converting a web application to a mobile application or hybrid mobile application in one embodiment of the present disclosure. Briefly, a native application refers to an application that is developed to run a specific platform, e.g., using one or more resources, e.g., operating system specific to that platform. Similarly, a native mobile application refers to an application written to run on specific mobile device. On the other hand, platform independent codes or program such as those written in JAVA or the like may be written once and run anywhere. A hybrid mobile application refers to an application comprising both native and platform independent codes, e.g., platform independent code wrapped inside a native container. The method may include separating a web application into a static content and a dynamic content with data sources at 102. For example, the dynamic content may include one or more data sources from which to retrieve data at run time of the web application. The method may further include rendering the static content as HTML pages with the links between the HTML pages converted to local links and references to dynamic content changed to REST requests at 104. In one embodiment, the code may be separated into modules. For example, the HTML containing the static content and then an import of a JavaScript library may be referenced in the static HTML page to make the REST calls to obtain the dynamic data, enabling one or more REST requests from the HTML page. The REST requests may be also inserted to the HTML pages. The method may also include packaging the HTML pages as a mobile application that can be down loaded from an application store to a mobile device at 106.

The method may further include utilizing a mobile gateway on a remote server for accessing the dynamic content with the data sources at 108. The application further may include a native library for accessing device specific features, application code, JavaScript, HTML, cascading style sheets (CSS), RESTful interfaces for each dynamic tag, and other application artifacts, e.g., icons, images, and/or an application manifest indicating version information for each component of the application. Thus, in one embodiment of the present disclosure, an application may comprise a set of resources, e.g.: 1) static HTML resources representing the view; 2) JavaScript resources to make the REST calls; 3) JavaScript resources that bridge to the native API calls (this is hybrid); 4) native libraries; 5) CSS resources for formatting and styling the HTML.

The method may also include at 110, utilizing the application manifest for identifying component difference between a local version of the mobile application on a mobile device and a remote version of the mobile application resident on a remote server. The method may further include at 112, updating the mobile application selectively by only updating the HTML and JavaScript of the local mobile application with the changes from the remote version.

As one example, dynamic content that is represented in a Web 1.0 style application, e.g., Groovy Templates, JSP and PHP, may be modeled. In that way, the dynamic aspects can be extracted from the static components of the web page creating a static html version of the application that can be hosted by any "web server". With the extracted dynamic components, the methodology of the present disclosure in one embodiment may use this model (data model associated with dynamic content of the web application) to generate a REST API for obtaining this dynamic data. An advantage of this solution is that by separating the HTML from the dynamic content, intermediaries can cache the static HTML resources and leverage the REST protocol for caching any of the services that are exposed via the REST API for the various CRUD operations (CREATE, RETRIEVE, UPDATE, DELETE).

A "web server" in the present disclosure refers to any server that is capable of file serving of static html resources (e.g., webkit containers for hybrid mobile applications such as PhoneGap™ or typical web servers such as Apache™), e.g., via hypertext transfer protocol (HTTP) requests, versus an application server such as WebSphere™ Application Server serving content such as JSPs or CGI plugins that can be used for executing script based languages such as PHP on Apache.

Figure 2:
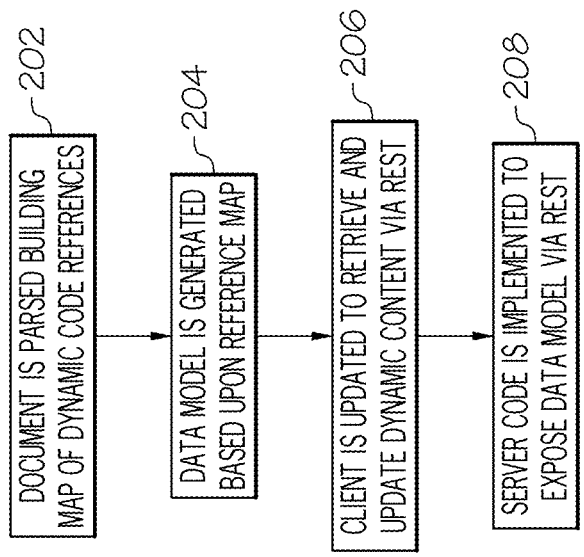
FIG. 2 is a flow diagram illustrating a method of converting dynamic content of a web application to a model such as RESTful data model based resources in one embodiment of the present disclosure.

FIG. 2 is a flow diagram illustrating a method of converting dynamic content of a web application to a model such as RESTful data model based resources in one embodiment of the present disclosure. FIG. 3 is an example form field that allows users to update their profile. This example illustrates using a very simple HTML form to help describe how this could be done. This is by no means limited to this simple use case but it should help describe how this could be implemented. In this example, the sample JSP page contains a standard JavaBean that contains user profile information. This JSP is composed of mostly HTML content with some input fields that are populated by data retrieved by the JavaBean (POJO). A web page or application may utilize other dynamic components, e.g., other reusable software component not limited to JavaBean, and others.

In this code snippet, for example, the dynamic aspects are identified by the syntax defined by JSPs (and similar notions exist in PHP as well). In this code snippet, there are two types of JSP tags. The first is <% %> which allows one to insert scripts (also referred to as code snippets) and the <%=%> which allows one to output dynamic content (which, e.g., does not have to be visually displayed in the browser (e.g., it could be used for calculations in javascript for instance)). These hints are used to automatically extract the elements and generate, e.g., a RESTful Asynchronous Javascript and XML (AJAX) call to obtain the values from the server.

Referring to FIG. 2, at 202, the content of a web application document may be parsed to build a map of dynamic code references. The parsing of the document is performed to locate any dynamic content. In the example shown in FIG. 3, the method of the present disclosure may find one scriptlet that retrieves a ProfileBean object based upon the logged in user. For example, remoteUser contains the user subject's log in identification (id). Once this bean is instantiated, the form will reference this bean to provide the current values that it has for that user.

At 204, data model is generated based on the map of dynamic code references (also referred to as a reference map). The data model, e.g., specifies the variable names or object names that needs to be dynamically resolved at runtime. FIG. 4 illustrates an example data modeled in JavaScript Object Notation (JSON) to denote the attributes associated with the REST request.

At 206, client code (application) or client-side code is updated to retrieve and update dynamic content via REST. Using the data model defined at 204, the method of the present disclosure in one embodiment refactors the web resource (application) or the code to remove the references to dynamic scripting that is executed on the server side. In this example, Dojo may be leveraged to invoke a REST application program interface (API) that is running on the server to obtain the ProfileBean that has been modeled at 204. In response to receiving the content from the server, the method of the present disclosure in one embodiment dynamically via JavaScript updates the various form fields that had previously been populated server side.

Figure 5:
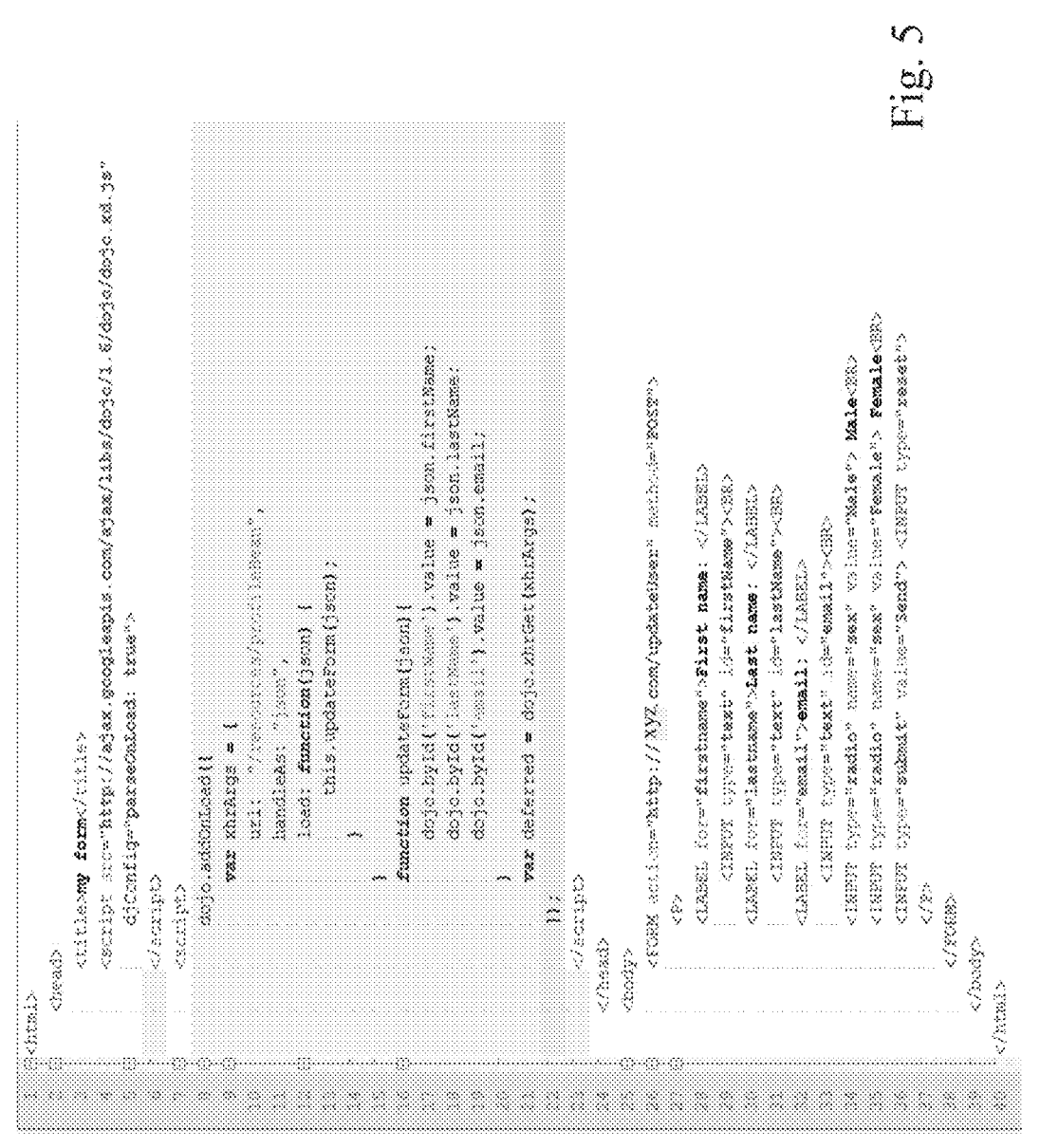

FIG. 5 illustrates an example of an updated client (application) based upon the parsed data model. The example code replaces the dynamic content in the code shown in FIG. 3. Lines 8-22 of the example code show invoking of REST to obtain the ProfileBean.

At 208, server code is implemented to expose data model via REST. FIG. 6 illustrates an example of REST API for retrieving data based upon the model. The method of the present disclosure in one embodiment creates a RESTful resource implementation that can retrieve the content. In this example, a servlet is wired as the RESTful resource. In this code, the ProfileBean is retrieved and populated based upon the logged in user. Once this action is performed, the content is transformed to XML and returned to the user.

The following illustrates an example of the content that is returned:

```
GET /resources/profileBean
result:
{
"firstName" : "Tom",
"lastName" : "Smith",
"email": "tom.smith@xxx.com",
"sex" : "MALE"
}
```

Figure 7:
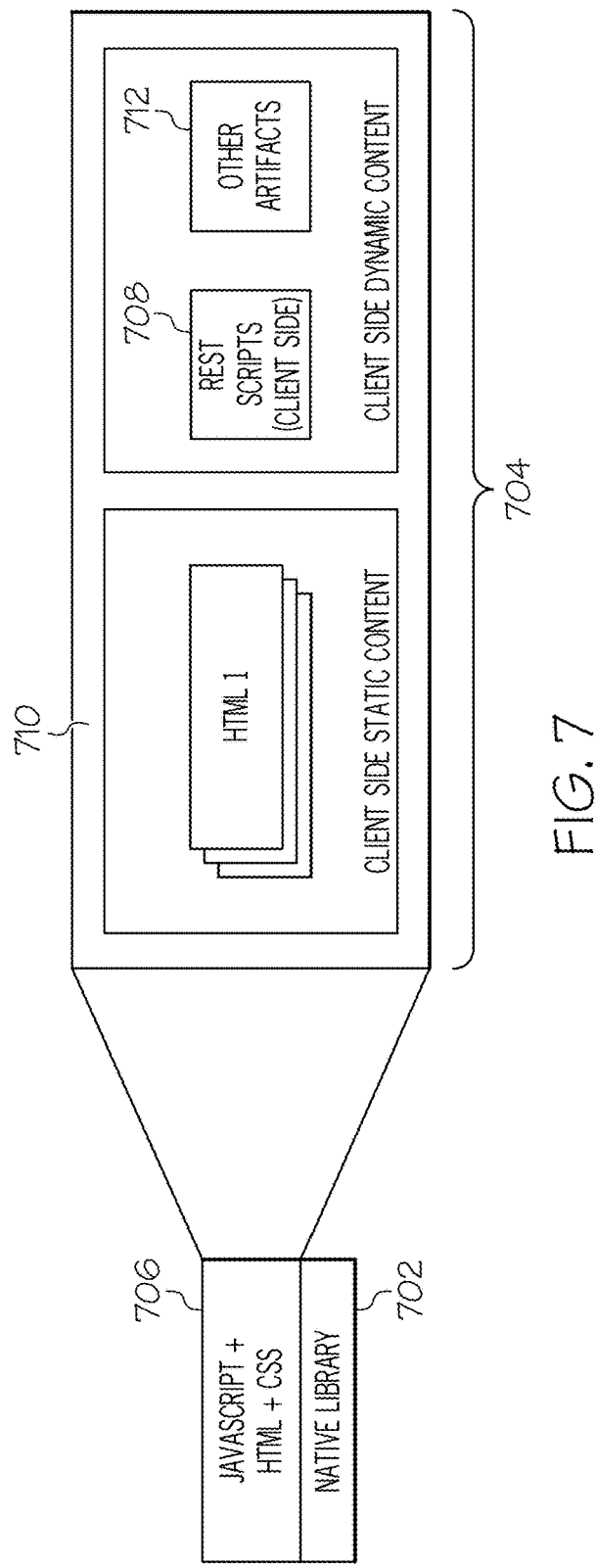
FIG. 7 is a diagram illustrating a mobile application packaged according to one embodiment of the present disclosure.

FIG. 7 is a diagram illustrating a mobile application packaged according to one embodiment of the present disclosure. A native library 702 comprises executable objects that can run on a mobile device. The native library 702 is used to access the device specific features. An application code 704 that has been converted from the web application performs its functions on the mobile device, and for example, may invoke one or more of functions of the native library 702. The application code may also utilize JavaScript, HTML, and/or CSS 706 executable on the mobile device. RESTful interfaces 708 for each dynamic tag is used to obtain the dynamic data from the web server. HTML file 710 contains static content of the code 704. Other application artifacts 712 such as icons, images, and others may be used in invoking the mobile application. In one aspect, the application code 704 comprises basic conversion from using web 1.0 styling or the like with JSPs to the RESTful or the like; The application code at 706 extends the code at 704 to also include the ability to use the native device APIs. The application code 706 may be further enhanced for a mobile device.

The entire contents may be packaged and deployed on an application store or the like that can be downloaded and installed on mobile devices. This helps the user to not have to retrieve every page from a server (since it is all packaged as part of the app) and the application feels like a native application.

In one embodiment of the present disclosure, such mobile application so deployed on a mobile device may be selectively updated, e.g., in optimized fashion. For instance, when an enterprise or like wants to update the mobile app, the enterprise can do so by the traditional way of packaging the entire mobile app and uploading to the application store and allowing the users download the entire app again to their devices.

Another way of updating a mobile app is to selectively update it. In one embodiment of the present disclosure, as part of packaging the mobile app, for example, an app manifest is added that has the information on the version of each component of the app.

An example of an appManifest is shown below:

```
appManifest
applicationVersion : version number
page1Version : version number
page2Version : version number
...
nativeLibraryVersion : version number
```

Figure 8:
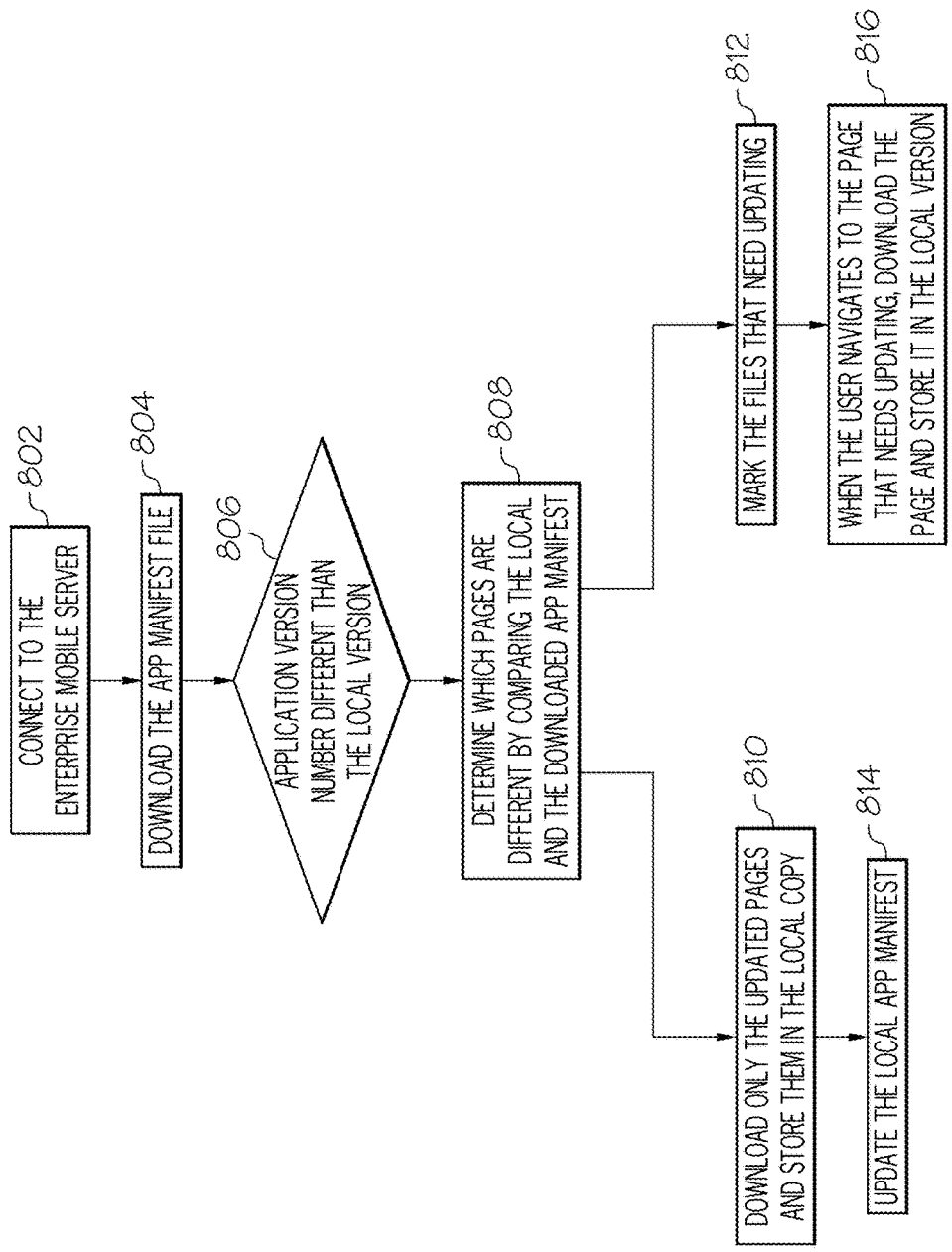
FIG. 8 is a flow diagram illustrating a method in which mobile app deployed on a mobile device may be updated, in one embodiment of the present disclosure.

A mobile application may be deployed to an application store and also to a mobile server. The mobile server may run within the enterprise and services the enterprise's mobile applications to its users. When users want to install the application initially, they go to the application store to install it, e.g., the application is downloaded from the application store and deployed onto the user's mobile device. FIG. 8 is a flow diagram illustrating a method in which mobile apps installed on a mobile device may be updated in one embodiment of the present disclosure. At 802, a mobile application running on a mobile device may connect to a mobile server or the like, e.g., run by an enterprise providing the mobile application to its customers or users. At 804, the mobile application downloads an app manifest file associated with the mobile application from the mobile server or the like. At 806, it is determined whether the version number associated with the application specified in the downloaded app manifest file different from the current mobile application's version number, e.g., by examining the version number specified in the app manifest file previously downloaded and stored on the mobile device. If the application version number is different, at 808, one or more components that have different version numbers are determined, e.g., by comparing the content of the downloaded app manifest file with the previously downloaded one.

In one embodiment of the present disclosure, one or more components that have different version numbers may be downloaded, and stored locally on the mobile device at 810, which has the effect of updating the mobile application immediately. Further, at 814, the app manifest file is updated with one or more version numbers corresponding to the one or more downloaded components.

In another embodiment of the present disclosure, one or more components that have different version numbers may be marked at 812. At 816, when or in response to detecting a user navigating to, or using, the marked component of the mobile application, the component may be updated by downloading it from the application store. The app manifest file is also updated with the version number of the downloaded and updated component.

The app manifest file need not be limited to the format shown above. For instance, the app manifest file need not be one file containing information about all of the components; rather, there may be an app manifest file for a component. Other format may be utilized as app manifest file.

With the method shown in FIG. 8, it becomes very easy to update parts of the mobile application. The application still looks and feels like a native application since all the HTML, JavaScript, CSS needed are packaged as part of the app and the user does not have to wait to download the artifacts every time. The mobile app provider can not only upgrade but also rollback changes easily by updating the artifacts hosted in the mobile server within the enterprise.

This method also provides the ability for the provider to selectively open up functionality to different sets of users. Depending on the user credentials, parts of the application can be updated to provide new features.

Figure 10:
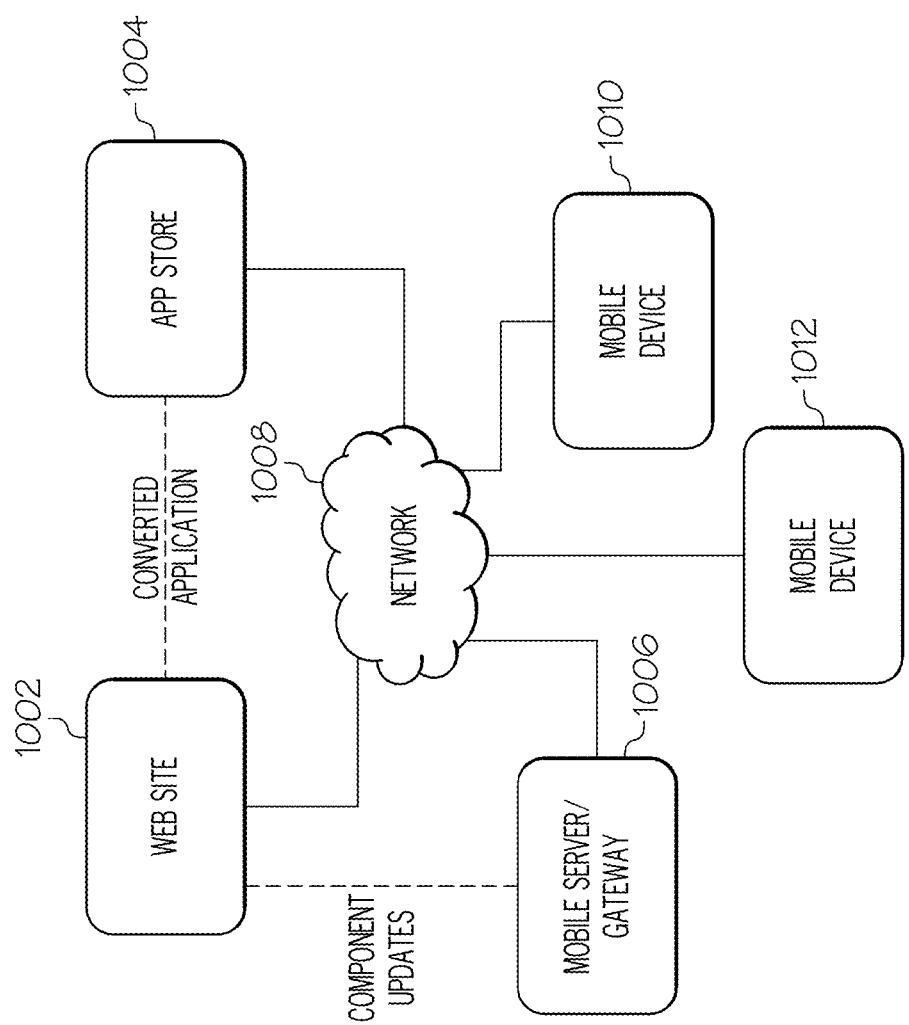
FIG. 10 illustrates an architectural overview of mobile enablement of web sites in one embodiment of the present disclosure.

FIG. 10 illustrates an architectural overview of mobile enablement of web sites in one embodiment of the present disclosure. A web site 1002 or a web application that displays or presents such site may be converted into a mobile application, e.g., as described above. The mobile application so converted may be stored in an application store 1004. One or more mobile devices (e.g., 1010, 1012) may download the mobile application from an application store or the like 1004, e.g., over a network 1008. Updates to one or more components of the mobile application associated with web site 1002 may be performed via a mobile server or gateway 1006. Such server or gateway 1006 may store or retrieve the updated components which may be downloaded to a mobile device, e.g., 1010, 1012.

Figure 9:
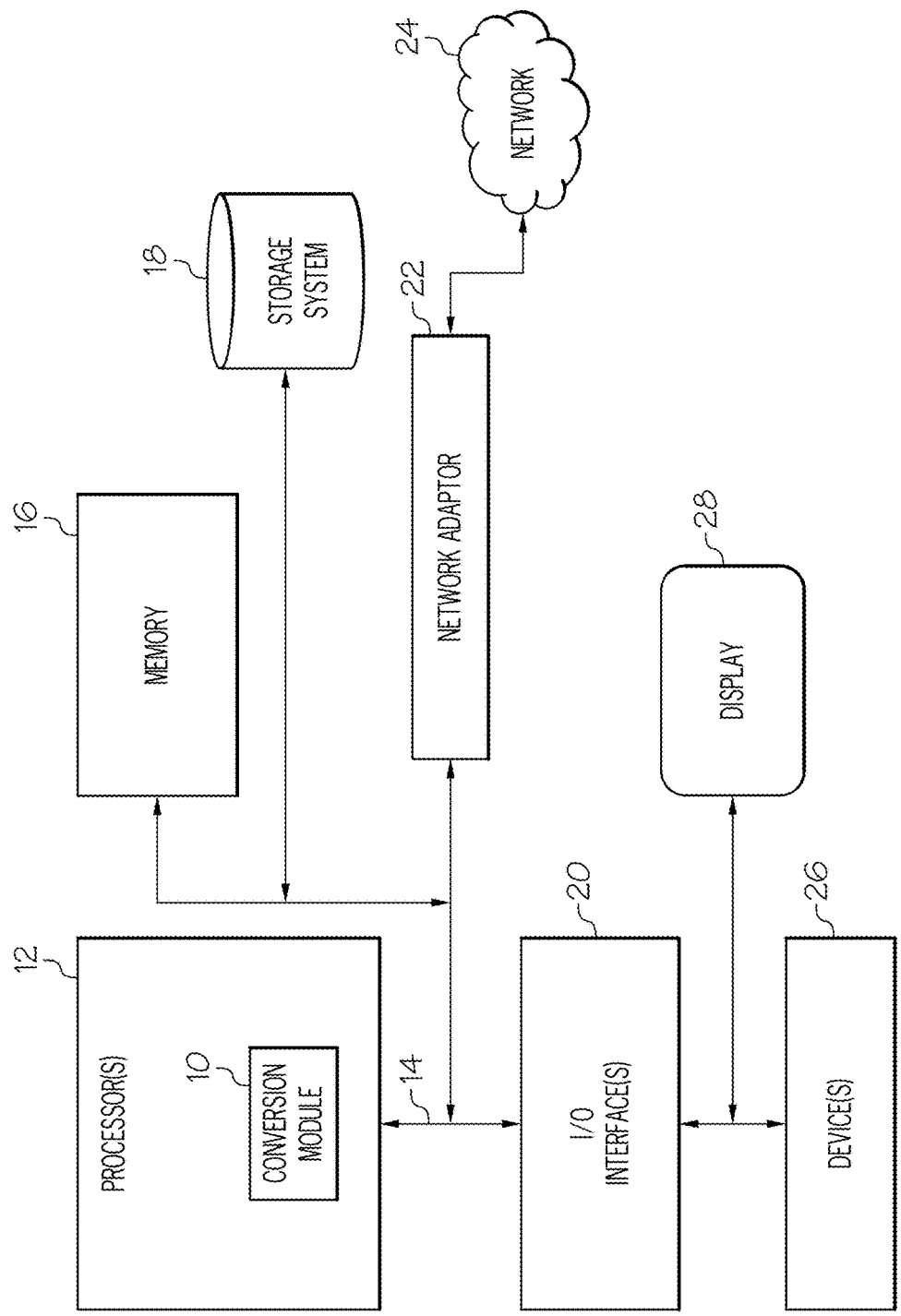
FIG. 9 illustrates a schematic of an example computer or processing system that may implement a system that enables conversion of a web site application to a mobile application in one embodiment of the present disclosure.

FIG. 9 illustrates a schematic of an example computer or processing system that may implement the system that provides mobile enablement of web site in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A non-transitory computer readable storage medium storing a program of instructions executable by a machine to perform a method of converting a web application to a mobile application, comprising:

separating the web application into a static content and a dynamic content, the dynamic content comprising at least dynamic scripting that is executed on a server side and object names to be dynamically resolved at runtime, the object names remaining in the dynamic content without being resolved at the time of separating;

rendering the static content as one or more hypertext markup language pages with one or more links between the hypertext markup language pages converted to local links;

changing one or more references to the dynamic content to representational state transfer requests, the changing comprising at least removing the dynamic scripting;

inserting the representational state transfer requests into said one or more hypertext markup language pages; and packaging as the mobile application, said one or more hypertext markup language pages with an icon, scripting code associated with the web application, an interface to an operating system of a mobile device, and a client-side aggregator for assembling multiple requests from the mobile application for dynamic data for sending the multiple requests in a single message, the client-side aggregator for receiving a single response and breaking the single response into separate responses corresponding to the multiple requests respectively, wherein the dynamic content remains unresolved in the packaged mobile application for downloading to the mobile device, the mobile application further programmed to selectively open up functionality to different sets of users, wherein a plugin created to run in an integrated programming development tool reads the web application and automatically identifies the dynamic content based on a hint in the web application.

2. The non-transitory computer readable storage medium of claim 1, wherein the packaged mobile application is stored to an application store for downloading to a user's mobile device.

3. The non-transitory computer readable storage medium of claim 1, wherein a mobile gateway on a remote server is utilized for accessing the dynamic content with the data sources.

4. The non-transitory computer readable storage medium of claim 1, wherein the packaged mobile application further comprises a native library for accessing device specific features associated with a mobile device.

5. The non-transitory computer readable storage medium of claim 1, wherein the packaged mobile application further comprises an application manifest that identifies a version number associated with each of components in the packaged mobile application.

6. The non-transitory computer readable storage medium of claim 5, further comprising updating the mobile application selectively on a component-basis based on the version number associated with said each component.

7. The non-transitory computer readable storage medium of claim 1, wherein the web application comprises a web site.

8. The non-transitory computer readable storage medium of claim 1, wherein the changing one or more references to the dynamic content to representational state transfer requests comprises parsing the dynamic content of the web application, generating a data model comprising the one or more data sources, and refactoring the web application by removing one or more references to dynamic scripting that is executed on a server side, and inserting one or more of the representational state transfer requests for retrieving said one or more data sources.

9. The non-transitory computer readable storage medium of claim 8, wherein the inserting one or more of the representational state transfer requests for retrieving said one or more data sources comprises creating a JavaScript that includes the one or more of the representational state transfer requests and referencing the JavaScript from the one or more hypertext markup language pages.

10. The non-transitory computer readable storage medium of claim 1, wherein the features in the mobile application are updated selectively based on a user credential.

11. The non-transitory computer readable storage medium of claim 1, wherein the mobile application is programmed to determine whether a version of the mobile application downloaded to the mobile device is different from a version of the mobile application specified by a mobile server, the mobile application programmed to mark one or more components of the mobile application having different versions responsive to finding that the version of the mobile application downloaded to the mobile device is different from the version of the mobile application specified by a mobile server, the mobile application programmed to detect a user navigating to the one or more components that are marked, the mobile application programmed to update the one or more components responsive to detecting the user navigating to the one or more components that are marked.

12. A system converting a web application to a mobile application, comprising:

a processor;

a conversion module operable to execute on the processor, the conversion module further operable to separate the web application into a static content and a dynamic content, the dynamic content comprising at least dynamic scripting that is executed on a server side and object names to be dynamically resolved at runtime, the object names remaining in the dynamic content without being resolved at the time of separating, the conversion module further operable to render the static content as one or more hypertext markup language pages with one or more links between the hypertext markup language pages converted to local links, the conversion module further operable to change one or more references to the dynamic content to representational state transfer requests by at least removing the dynamic scripting and inserting calls to the representational state transfer requests into said one or more hypertext markup language pages, wherein said one or more hypertext markup language pages are packaged as the mobile application with an icon, scripting code associated with the web application, an interface to an operating system of a mobile device, and a client-side aggregator for assembling multiple requests from the mobile application for dynamic data for sending the multiple requests in a single message, wherein the dynamic content remains unresolved in the packaged mobile application for downloading to the mobile device, the mobile application further programmed to selectively open up functionality to different sets of users, wherein a plugin created to run in an integrated programming development tool reads the web application and automatically identifies the dynamic content based on a hint in the web application.

13. The system of claim 12, wherein the packaged mobile application is stored to an application store for downloading to a user's mobile device.

14. The system of claim 12, wherein a mobile gateway on a remote server is utilized for accessing the dynamic content with the data sources.

15. The system of claim 12, wherein the packaged mobile application further comprises a native library for accessing device specific features associated with a mobile device.

16. The system of claim 12, wherein the packaged mobile application further comprises an application manifest that identifies a version number associated with each of components in the packaged mobile application.

17. The system of claim 16, wherein the mobile application is updated selectively on a component-basis based on the version number associated with said each component.

18. The system of claim 12, wherein the web application comprises a web site.

19. The system of claim 12, wherein the mobile application updates the one or more components selectively based on a user credential.

20. The system of claim 12, wherein the mobile application is programmed to determine whether a version of the mobile application downloaded to the mobile device is different from a version of the mobile application specified by a mobile server, the mobile application programmed to mark one or more components of the mobile application having different versions responsive to finding that the version of the mobile application downloaded to the mobile device is different from the version of the mobile application specified by a mobile server, the mobile application programmed to detect a user navigating to the one or more components that are marked, the mobile application programmed to update the one or more components responsive to detecting the user navigating to the one or more components that are marked.

* * * * *